(12) United States Patent
Hagman et al.

(10) Patent No.: US 9,777,932 B2
(45) Date of Patent: Oct. 3, 2017

(54) SYSTEM FOR ENERGY RECOVERY AND CLEANING OF HEAT EXCHANGERS IN SHOWER APPLICATIONS

(71) Applicants: Henrik Hagman, Umeå (SE); Gustav Nillson, Umeå (SE)

(72) Inventors: Henrik Hagman, Umeå (SE); Gustav Nillson, Umeå (SE)

(*) Notice: Subject to any disclaimer, the term of this patent is extended or adjusted under 35 U.S.C. 154(b) by 61 days.

(21) Appl. No.: 15/013,602

(22) Filed: Feb. 2, 2016

(65) Prior Publication Data

US 2016/0169538 A1 Jun. 16, 2016

Related U.S. Application Data

(63) Continuation-in-part of application No. PCT/SE2014/000105, filed on Aug. 6, 2014.

(30) Foreign Application Priority Data

Aug. 6, 2013 (SE) ........................... 1330095

(51) Int. Cl.
*F24H 3/00* (2006.01)
*F24D 17/00* (2006.01)
(Continued)

(52) U.S. Cl.
CPC .......... *F24D 17/0005* (2013.01); *E03C 1/044* (2013.01); *E03C 1/0408* (2013.01);
(Continued)

(58) Field of Classification Search
CPC .... F28D 7/0025; F28D 21/0012; F28D 7/024; F24D 17/0005; F24D 2200/20; F28G 9/00; F28G 13/005; E03C 1/0408; E03C 1/044
(Continued)

(56) References Cited

U.S. PATENT DOCUMENTS 4,372,372 A * 2/1983 Hunter ................ F24D 17/0005
165/109.1
4,542,546 A * 9/1985 Desgagnes ................ E03C 1/12
165/66

(Continued)

FOREIGN PATENT DOCUMENTS

DE 29615555 10/1996
GB 2052698 1/1981
GB 2232749 12/1990

OTHER PUBLICATIONS

PCT/SE2014/000105; Written Opinion of the International Searching Authority.

*Primary Examiner* — Davis Hwu

(57) ABSTRACT

A system is provided for heat recovery from shower greywater. An outlet for greywater is connected to a heat exchanger's inlet for greywater and the heat exchanger is designed so that a cold supply water flows in the opposite direction through the heat exchanger relative to the relatively hot greywater, so that heat exchange works under a counterflow principle and heat energy is transferred from the hot greywater to the cold supply water. A manifold having a nozzle outlet for hot supply water is connected to a waste pipe so that the manifold nozzle outlet for hot supply water opens into the waste pipe at a position downstream of the waste pipe inlet for greywater but upstream of the waste pipe outlet for greywater.

13 Claims, 2 Drawing Sheets

(51) Int. Cl.
*F28G 9/00* (2006.01)
*E03C 1/04* (2006.01)
*E03C 1/044* (2006.01)
E03C 1/00 (2006.01)
F28G 13/00 (2006.01)
F28D 21/00 (2006.01)

(52) U.S. Cl.
CPC .......... *F28G 9/00* (2013.01); *E03C 2001/005* (2013.01); *F24D 2200/20* (2013.01); *F28D 21/0012* (2013.01); *F28G 13/005* (2013.01); *Y02B 30/566* (2013.01)

(58) Field of Classification Search
USPC .......................................................... 165/47
See application file for complete search history.

(56) References Cited

U.S. PATENT DOCUMENTS

| | | | |
|---|---|---|---|
| 4,619,311 A | 10/1986 | Vasile et al. | |
| 5,791,401 A * | 8/1998 | Nobile | E03C 1/00 137/247.41 |
| 2007/0089230 A1* | 4/2007 | Hendricks | A61H 33/6068 4/596 |
| 2011/0155366 A1* | 6/2011 | Brunn | F28D 7/024 165/287 |
| 2012/0061056 A1* | 3/2012 | Claudon | F24D 17/0005 165/104.19 |

* cited by examiner

US 9,777,932 B2

SYSTEM FOR ENERGY RECOVERY AND CLEANING OF HEAT EXCHANGERS IN SHOWER APPLICATIONS

TECHNICAL AREA AND BACKGROUND OF THE INVENTION

The present invention involves energy recovery from shower greywater. In particular, the invention relates to a system for heat exchanger based heat recovery from shower greywater, and cleaning of heat exchangers in shower greywater heat recovery applications.

The amount of energy that is flushed down the drain and wasted in ordinary showers is relatively large compared to other power consuming devices on the consumer market. A standard shower consumes a power of about 8 to 30 kW, depending on the temperature and flow of shower greywater. Therefore, there is a significant potential to reduce the hot supply water usage (and energy consumption) in households by using the heat in the relatively hot shower greywater to heat up the cold water before the hot supply water reaches the shower mixer. A number of solutions for energy recovery from shower greywater are described in literature. See for example, foreign and US patents numbered GB2232749, U.S. Pat. No. 4,619,311 and GB2052698.

SUMMARY OF THE INVENTION

A major benefit of recycling heat energy from the in greywater applications relatively hot supply water from the shower drain, to heat the shower mixer cold water supply, is that the large difference in temperature between the cold supply water and the shower greywater enables efficient heat transfer and a high over all efficiency compared to central heat recovery systems that are commercially available for both households and larger estates. In centralized systems, the loss of energy from the system, and the mixing between shower grey water with relatively cold and heavily soiled water from toilets results in a generally poor efficiency. A number of solutions for energy recovery from shower greywater are described in literature, see for example foreign and U.S. patents numbered GB2232749, U.S. Pat. No. 4,619,311 and GB2052698. A disadvantage of the existing solutions for recovering energy from water shower is that the efficiency is low. To our knowledge, there is no described apparatus for recovering heat energy from shower greywater having an efficiency greater than 55%. Industrial heat exchangers with higher efficiency are available but to our knowledge no one has been able to successfully exploit such a heat exchanger in a system for recovering energy from shower greywater. The inventors of the present application have recognized that when heat exchangers with high efficiencies are used (such as efficiencies above 60%), this results in precipitation and deposit buildup on heat transfer surfaces causing the heat exchangers to clog and lose performance. This can in itself also be a problem when heat exchangers with lower efficiency are used, but since the shower greywater in these cases is not cooled as much there will not precipitate for example as much fat/tallow/wax and the heat exchangers can therefore work more or less satisfactory in the long term, also with today's commercially available technology. The inventors have realized that the existing systems for energy recovery from shower greywater can be improved by using a heat exchanger with efficiencies above 60%. The inventors have also recognized that systems for energy recovery from shower greywater that are based on heat exchangers with efficiencies above 60% needs to be designed so that for example fats, and other blockage can be removed from the heat exchanger's heat transfer surfaces. The inventors have solved this problem by designing a system for heat recovery from shower greywater, including a technical solution for efficient, hygienic and simple cleaning of the heat exchanger heat transfer surfaces. In the preferred embodiment, without the use of any moving parts in the shower greywater.

A first aspect of the invention therefore relates to a system for heat recovery from shower greywater comprising:
  a) a heat exchanger (1) having an inlet for greywater (2), an outlet for greywater (3), an inlet for cold supply water (4) and an outlet for preheated supply water (5);
  b) a waste pipe (6) having an inlet for the graywater (7) and an outlet for greywater (8);
  c) a strainer (9) placed upstream of the waste pipe inlet for greywater (7); where the waste pipe outlet for greywater (8) is connected to the heat exchanger's inlet for the greywater (2) and the heat exchanger (1) is designed so that the cold supply water flows in the opposite direction through the heat exchanger (1) relative to the hot greywater, so that heat exchange works with the counterflow principle and transfers heat energy from the relatively hot greywater to the cold supply water; where a manifold (10) having a nozzle outlet for hot supply water (11) that is connected to the waste pipe (6) so that the manifold with the nozzle outlet for hot supply water (11) opens into the waste pipe (6) at a position downstream the waste pipe inlet for greywater (7) and upstream the waste pipe outlet for greywater (8).

A second an additional aspect of the invention relates to a thermostatic mixing valve (25), connected to the heat exchanger outlet for preheated supply water (5) and the cold water supply pipe (24), ensuring that the heat stored in the heat exchanger (1) during the hot water cleaning, does not result in scolding hot water entering the shower mixer (17) cold water inlet A third aspect of the present invention relates to a shower cubicle (22) or a shower tray containing a system according to the first aspect of the invention.

A fourth aspect of the invention relates to a method for cleaning a heat exchanger in a system according to the invention in its first aspect, comprising the heat exchanger (1) which is cleaned by the introduction of hot supply water with a temperature of at least 50° C. and a pressure of at least 2 bar in the waste pipe (6) through the nozzle outlet manifold (10).

A fifth aspect of the invention relates to the use of a system according to the first aspect of the recovery of heat from the shower greywater.

DETAILED DESCRIPTION OF EMBODIMENTS OF THE INVENTION

Figure 1A:
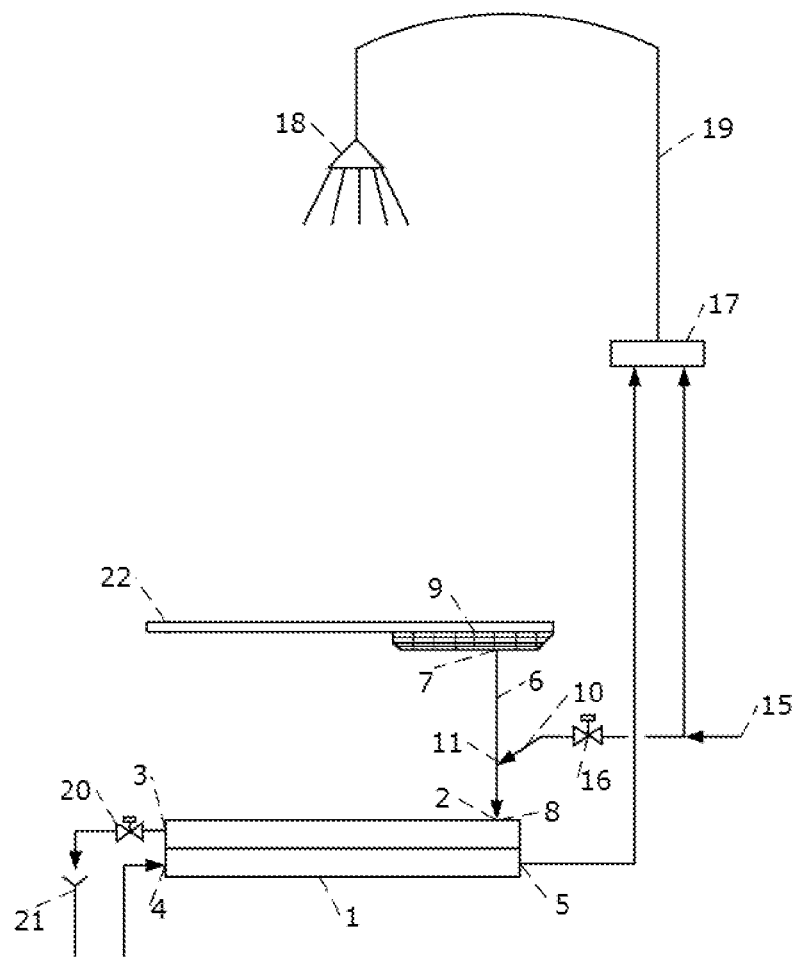
FIG. 1a shows an exemplary system for recovery of heat from the shower greywater of the present invention.

Figure Designations (1) Heat Exchanger
(2) The heat exchanger inlet for greywater (3) The heat exchanger outlet for greywater
(4) The heat exchanger inlet for cold supply water
(5) The heat exchanger outlet for heated supply water
(6) Waste pipe
(7) Waste pipe inlet for greywater
(8) the waste pipe outlet for greywater
(9) Strainer
(10) Manifold
(11) Manifold with nozzle outlet for hot supply water
(12) the waste pipe diameter
(13) The angle between the manifold nozzle outlet for hot supply water and waste pipe
(14) The manifold nozzle inlet for hot supply water
(15) Hot supply water supply
(16) Shut-off valve for hot supply water supply to manifold
(17) Shower mixer
(18) Shower Head
(19) Temperate water from shower mixer
(20) Shut-off valve for greywater outlet
(21) Water trap
(22) Shower cubicle
(23) Cold supply water feed
(24) Cold supply water to thermostatic mixing valve
(25) Thermostatic mixing valve Energy recovery from shower greywater has been described previously and devices for this purpose are commercially available today. Some problems with the prior existing heat recovery systems are:
1) The heat exchanger has a relatively low efficiency
2) Heat exchanger performance decreases over time due to precipitation and clogging including fats on heat transfer surfaces.

The inventors of the present application have solved the problems of previous systems by a design that facilitates efficient cleaning of the heat transfer surfaces without the need for dismantling the heat exchanger, in a preferred embodiment without any moving parts in the waste pipe. The system is based on a heat exchanger having an inlet for the relatively hot greywater, an outlet for the cooled greywater, an inlet for the cold supply water and an outlet for preheated supply water. The heat exchanger is designed so that the cold supply water flows in the opposite direction through the heat exchanger relative to the warm greywater so that the heat exchanger works according to the counterflow principle, so that heat energy from the relatively hot greywater is transferred to the cold supply water. The system also has a strainer, located in the shower tray, that serves to prevent hair and other relatively large debris from entering and blocking that the greywater side of the heat exchanger. Between the strainer and the heat exchanger inlet for greywater a waste pipe transports the greywater. On the waste pipe, a manifold having a nozzle outlet for hot supply water is placed. Via the specialized design of manifold and nozzle, hot supply water can be introduced with high speed in the waste pipe via the nozzle, upstream the heat exchanger, in order to create a pumping action which drives the flow through the heat exchanger to remove fats and other deposits from the heat exchanger heat transfer surfaces. At the same time the pumping action prevents the cleaning hot supply water to flow backwards out of the waste pipe inlet for example in a shower cubicle tray, without movable parts being used in the waste pipe and greywater. That moving parts are excluded from the design is advantageous with respect to the particle-rich and generally problematic environment that greywater represents for moving parts. A separate supply of hot supply water through the manifold is essential for an effective cleaning of the heat exchanger. To clean effectively, it is important not to let cold supply water pass through the heat exchangers cold side during cleaning when the cleansing hot supply water passes on the greywater side. Simultaneous cooling and heating of the heat exchanger surfaces would result in ineffective cleaning and ultimately increased clogging of the heat exchanger as the heat exchange between hot supply water and cold supply water would cool the fouled heat exchanger surfaces which would counteract the melting and dissolution of fats and other deposits during cleaning. The inventors have realized that it is inappropriate to use hot supply water from a shower mixer while cleaning the heat exchanger, because most modern thermostatic mixers mix cold water in the hot supply water by default, and also throttles the hot supply water flow to insufficient levels when the cold water supply to the thermostatic mixer is blocked. Even if the invention is specifically designed for the use of heat exchangers with high efficiency, the invention is also possible to use with heat exchanger systems with an efficiency below 55%.

A first aspect of the invention relates to a system for heat recovery from shower greywater comprising
a) a heat exchanger (1) having an inlet for greywater (2), an outlet for greywater (3), an inlet for cold supply water (4) and an outlet for preheated supply water (5);
b) a waste pipe (6) having an inlet for the waste (7) and an outlet for greywater (8);
c) a strainer (9) provided upstream of the waste pipe inlet for greywater (7); where the waste pipe outlet for greywater (8) is connected to the heat exchanger's inlet for the greywater (2) and the heat exchanger (1) is designed so that the cold supply water flows in the opposite direction through the heat exchanger (1) relative to the hot greywater, so that the heat exchanger works via the counterflow principle resulting in a heat transfer from the hot greywater to the cold supply water. A manifold (10) having nozzle outlet for hot supply water (11) is connected to the waste pipe (6) so that the manifold outlet nozzle for hot supply water (11) opens into the waste pipe (6) at a position downstream of the waste pipe inlet for greywater (7) but upstream of the waste pipe outlet for greywater (8).

To make the cleaning of the heat exchanger simple, efficient and hygienic, it is advantageous to design the system so that the water does not flow backwards up out of the waste pipe inlet and tray when cleaning. This can for example also be accomplished by that the waste pipe (6) is provided with a check valve. In one embodiment, therefore, a check valve is positioned in the waste pipe (6) at a position between the waste pipe inlet for greywater (7) and the manifold outlet for hot supply water (11). In this embodiment, the nozzle in the hot supply water outlet in the manifold is not needed. The inventors have discovered that the location, angle and nozzle design on the manifold outlet for hot supply water (11) can be adjusted so that a check valve is not required. This is very advantageous because the need for moving parts in the greywater is removed, allowing for high reliability and reduced production costs for energy recovery systems compared to systems with moving parts in the grey water. The inventors have also showed that the location, design and angle of the nozzle outlet for hot supply water (11) is crucial to how effective and hygienic the cleaning of the heat exchanger becomes.

In Example 1 the inventors show that cleaning works effectively when the manifold nozzle outlet for hot supply water (11) is located at a distance from the heat exchanger's inlet for the greywater (2) (or sharp bends of the waste pipe) which is at least equal to two times the diameter of the waste pipe (12). At shorter distances the cleaning works considerably worse, see Example 1. The inventors have also shown that the angle at which the hot supply water is entering the waste pipe is important. The cleaning works well at angles less than 55 degrees but significantly worse at 55 degrees or greater. The inventors have shown that the positioning of the manifold described can produce a pumping action which effectively cleans the heat exchanger while preventing the water from flowing backwards up uravloppet cleaning. In one embodiment, a check valve is positioned in the waste pipe (6). In one embodiment, the manifold nozzle outlet for hot supply water (11) is connected to the waste pipe (6) at a distance from the heat exchanger's inlet for the greywater (2) (or sharp bends in the waste pipe) which is large enough to prevent water from flowing backwards up through the waste pipe. In one embodiment, the manifold nozzle outlet for hot supply water (11) is directed downstream of the waste pipe (5) at an angle (13) relative to the waste pipe (6) which is small enough to prevent water from flowing backwards up through the waste pipe.

In a particularly preferred embodiment, the manifold nozzle outlet for hot supply water (11) is connected to the waste pipe (6) at a distance from the heat exchanger's inlet for the greywater (2) which is at least equal to twice the waste pipe diameter (12) and the manifold nozzle outlet for hot supply water (11) is directed downstream the waste pipe (5) at an angle (13) less than 55 degrees relative to the waste pipe (6). Basically, the manifold nozzle outlet for hot supply water (11) can be directed in the waste pipe flow direction, that is, the angle (13) relative to the waste pipe can be 0 degrees provided that the nozzle diameter and the distance between the heat exchanger inlet and nozzle mouth is well balanced. In such a construction, however, the connection of the manifold to the waste pipe is more troublesome and production costs could rise. For practical reasons, it is preferred to have an angle (13) which is at least greater than 10 degrees, preferably greater than 30 degrees. In a preferred embodiment, therefore, the manifold nozzle outlet for hot supply water (11) directed downstream of the waste pipe (6) at an angle (13) of 10-55 degrees, preferably 30-45 degrees relative to the waste pipe (6).

The strainer should be designed so that it prevents hair and larger particles/debris from entering and clogging the heat exchanger. In a preferred embodiment, therefore the strainer (9) mesh with mesh openings of around 0.2-2 mm should be used.

The manifold nozzle outlet for hot supply water (11) may be designed with a single hole, but it is also possible to design it with several holes. For example, the manifold nozzle outlet for hot supply water (11) could have a nozzle having a plurality of holes. Whatever form of the manifold nozzle outlet for the hot supply water, it is advantageous if the total crossection of the outlet nozzle for hot supply water (11) is between 5-80 $mm^2$. In one shape the manifold nozzle outlet for hot supply water (11), has a total area of 5-80 $mm^2$, preferably 7-40 mm2. In one embodiment, the manifold nozzle outlet for hot supply water (11) of one hole having a diameter of 2-10 mm, preferably 3-7 mm. In one embodiment the nozzled outlet for hot supply water (11) is designed with more than one hole, where at least one of the holes has a diameter of 2-10 mm, preferably 3-7 mm. In one embodiment the waste pipe diameter is 25-80 mm, preferably 30-55 mm, so as 30-45 mm. In one embodiment, the distance from the manifold nozzle outlet for hot supply water (11) and the heat exchanger's inlet for the greywater (2) (or shar bends of the pipe) is at least 50 mm; such as at least 60 mm. Such as at least 72 mm, such as at least 80 mm such as at least 100 mm. In one embodiment, the distance from the manifold nozzle outlet for hot supply water (11) and the heat exchanger's inlet for the greywater (2) 50-500 mm, such as 60-400 mm, such as 72-144 mm.

For optimum cleaning of the heat exchanger, a cleaning water having a temperature of at least 50 degrees Celsius and a pressure greater than atmospheric pressure is required. In an ordinary household, this can be accomplished by connecting the hot water inlet of the system to the household hot water supply. In one embodiment, the manifold (14) is connected to a hot supply water source (15). In one embodiment, the hot supply water source (15) water having a temperature of at least 50 degrees, preferably at least 55 degrees. In one embodiment, the hot supply water supply (15) water has a pressure of 2 bar (g). In one embodiment, the hot supply water source is a hot supply water pipe. The hot water for cleaning the heat exchanger should be turned off when cleaning is not done. In one embodiment, the system therefore includes a shut-off valve for hot supply water (16) to control the flow of hot supply water from the hot supply water source (15) to the waste pipe (6) where the shut-off valve (16) is positioned between the manifold nozzle outlet for hot supply water (11) and hot water supply to the manifold.

As mentioned above, the system is particularly well suited for heat exchangers with high efficiency because of the problems with fouling caused by for example grease in these cases will be larger than for low efficiency heat exchangers, hence an effective cleaning becomes more critical for high efficiency heat exchangers. In one embodiment, the heat exchanger has an efficiency of at least 60%, preferably at least 65%, preferably at least 70%. In one embodiment, the heat exchanger has a volume of 0.5-5 liters.

The system of the present invention is adapted to preheat the cold water input with excess heat energy from the relatively hot shower greywater flowing through the heat exchanger in the opposite direction. The preheated "cold" supply water is then preferably led from the heat exchanger outlet for preheated supply water (5) to a shower mixer (17) where it is mixed with hot supply water from a hot water supply pipe to give a shower water of a desired temperature. In one embodiment, the heat exchanger's outlet for preheated "cold" supply water (5) is connected to a shower mixer (17). In one embodiment, the shower mixer (17) is connected to a hot supply water source (15) containing water with a temperature of at least 50 degrees. In one embodiment, the shower mixer (17) and the manifold (10) is connected to the same hot supply water source (15). In one embodiment, the system includes a shower head (18) connected to the shower mixer (17) via a water pipe for temperated water (19). In one embodiment, the water supply for temperated water (19), is a hose or a tube.

Although the cleaning described above is very effective, in some cases, or at some time, it can be desirable to make a more thorough cleaning of the heat exchanger (1). In some cases it may be desirable to use a cleaning agent. In some cases, the cleaner agent may need to expose the heat exchanger (1) for an extended period of time. For this to work properly, and to at the same time minimize the use of cleaning agents, it may be advantageous to be able to close the outlet for greywater (3) so that the cleaning agent remains in the heat exchanger. This may be achieved for example by a shut-off valve located at a position downstream of the heat exchanger's outlet for the greywater (3). In one embodiment, therefore, a shut-off valve for greywater (20) is located downstream the heat exchanger outlet for greywater (3). In one embodiment, the system includes a water trap (21) located downstream of the shut-off valve for greywater (20).

During hot water cleaning of the heat exchanger (1), the temporarily stagnant cold water in the heat exchanger between positions (4) and (5) is heated to a temperature close to the hot water used for the cleaning. With hot water exiting the heat exchanger in position (5) instead of water with the normal preheated cold supply water temperatures, a risk of scolding can arise. A second and additional aspect of the invention therefore relates to a thermostatic mixing valve (25), connected to the heat exchanger outlet for preheated supply water (5) and the cold water supply pipe (24), ensuring that the heat stored in the heat exchanger (1) during the hot water cleaning, does not result in that scolding hot water is fed to the shower mixer (17) after heat exchanger cleaning. The thermostatic mixing valve (25) is crucial for a fully consumer friendly and safe operation of hot supply water cleaned heat exchanger shower applications.

The system of the present invention is particularly well suited for showers. A third aspect of the invention therefore relates to a shower cubicle or a shower tray (22) containing a system in accordance with the first aspect embodiment.

A fourth aspect relates to a method for cleaning a heat exchanger in a system in accordance to any of the above mentioned aspects or embodiments, comprising a heat exchanger (1) that is cleaned by water of at least a temperature of 50° C. and a pressure of at least 2 bar, that is introduced in the waste pipe (6) through the manifold (10) outlet nozzle (11).

A fifth aspect of the invention relates to the use of a system according to the prior aspects embodiments for recovery of heat from shower greywater.

Example 1

Description of the Rig and Experimental Activities

A system for energy recovery from shower greywater heat was built around the plate heat exchanger TL3B2 from Alfa Laval, the plates were 0.4 mm thick and made of alloy 304. A technical rig for verification and evaluation of the techniques were built and evaluated, and later implemented in a commercially available shower cubicle (Cello Atlas plus). The heat exchanger performance at different contamination levels, flow rates and temperatures were logged with online temperature and flow measurements. Different principles and system designs for cleaning clogged heat exchanger was evaluated. Two different thermostatic mixers, one from FM Mattson, and one from Monticello were used in the evaluations. The waste pipe had an inner diameter of 36 mm, the other water pipes and hot supply connections had an internal diameter of 13 mm. The conclusions of the technical work can be divided into essentially two parts:

In a first part we showed that cleaning with the help hot supply water does not work reliably when using heated water from the thermostatic mixer (17) to the manifold (10). However, a separate pipe was connected to the hot supply water (15) to the manifold (10), resulted in a high cleaning power where the clogged deposits of for example fat could be removed. When the cold water to the thermostat mixer was turned off in an effort to achieve the same cleaning power as the direct connection of the manifold (10) to the hot supply water (15) the thermostat mixer gave no usable hot supply water flow.

In a second series of experiments, the inventors studied how they could provide hot supply water for cleaning in the best possible way, which led to the development of the specially design manifold equipped with a nozzle outlet for hot supply water that creates a pumping action during cleaning. Decisive for the specially designed manifold pumping action and for cleaning the efficiency proved to be the distance from the manifold nozzle outlet (11) and the heat exchanger's inlet for the greywater (2) (or sharp bends in the waste pipe) is equal to more than two waste pipe diameters, and that the angle (13) between the manifold inlet for hot supply water and the waste pipe is small enough and angled downstream from heat exchanger inlet (2), see table 1. The inventors have shown that if the angle (13) is large (greater than 55 degrees), or the distance between the hot water outlet nozzle of the manifold (11) and the heat exchanger's inlet for the greywater (2) is too small (less than two-waste pipe diameters), or if the nozzle of the manifold hot supply water nozzle does not have the correct diameter, cleaning water will flow backwards out of the strainer (9) and into for example the shower cubicle tray, see Table 1. The ratio of the distance between the hot water nozzle outlet of the manifold (11) to the heat exchangers inlet for greywater (2) was found to be the same during evaluation of different nozzle geometries and nozzle cross sections.

TABLE 1

Experimental setup and design parameter effect on the manifold functionality

| Distance from nozzle hot water outlet (11) to heat exchanger inlet for greywater (2) [number of equivalent waste pipe diameters (length in mm)] | Angle (13) between manifold (10) and waste pipe (6) [degrees] | Nozzle diameter [mm] | Result [Not working or Working] |
|---|---|---|---|
| 1.8 (65 mm) | 25 | 5 | Not working |
| 1.8 (65 mm) | 45 | 3 | Not working |
| 1.8 (65 mm) | 45 | 5 | Not working |
| 1.8 (65 mm) | 45 | 7 | Not working |
| 1.8 (65 mm) | 60 | 5 | Not working |
| 2.0 (72 mm) | 25 | 5 | Working |
| 2.0 (72 mm) | 45 | 3 | Working |
| 2.0 (72 mm) | 45 | 5 | Working |
| 2.0 (72 mm) | 45 | 7 | Working |
| 2.0 (72 mm) | 60 | 5 | Not working |
| 4.0 (144 mm) | 25 | 5 | Working |
| 4.0 (144 mm) | 45 | 3 | Working |
| 4.0 (144 mm) | 45 | 5 | Working |
| 4.0 (144 mm) | 45 | 7 | Working |
| 4.0 (144 mm) | 60 | 5 | Not working |

Example 2

Exemplary Embodiments of the Invention

Figure 1B:
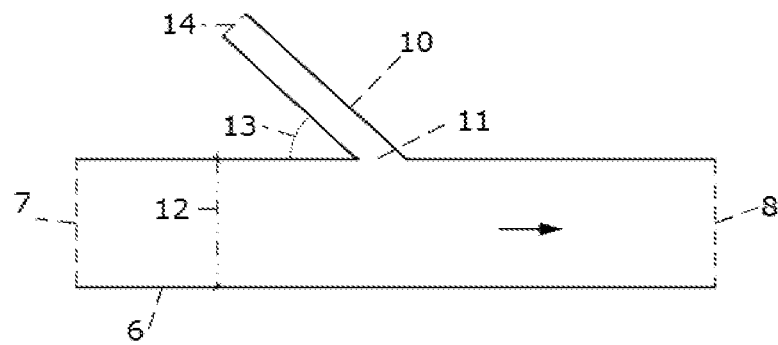
FIG. 1b shows the connection of the manifold to the waste pipe
Figure 1C:
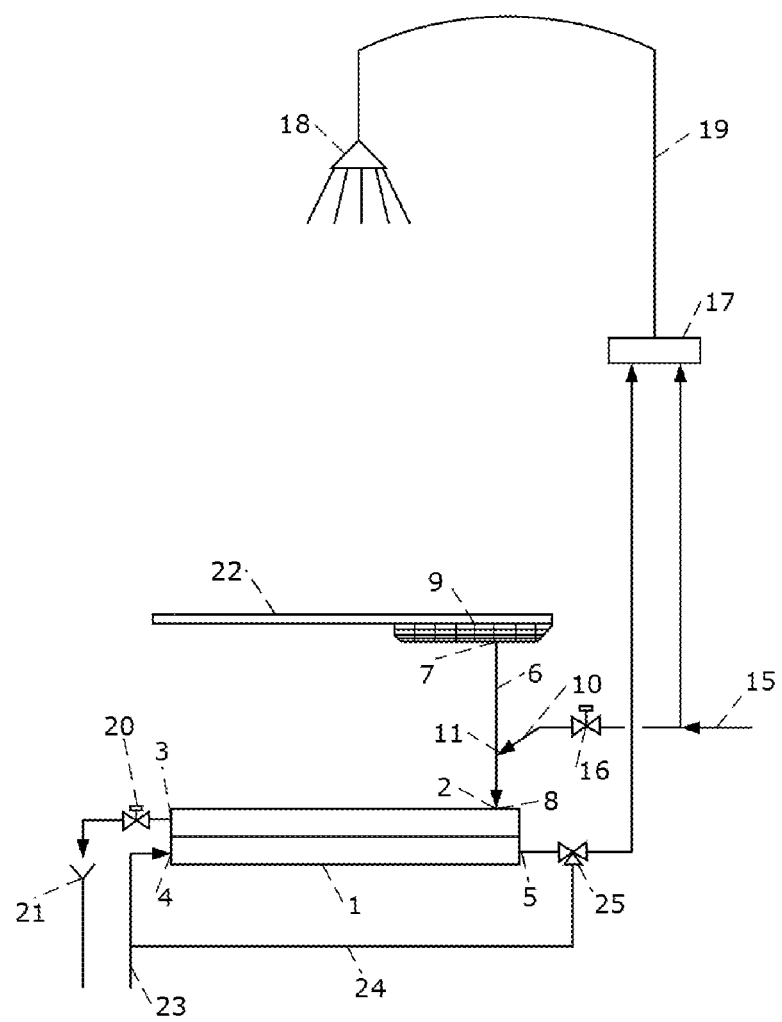
FIG. 1c illustrates a system for recovery of heat from the shower greywater according to FIG. 1a, with an added thermostatic mixing valve and cold water supply pipe.

FIG. 1 a shows an exemplary system for recovery of heat from the shower greywater containing a heat exchanger (1) having an inlet for hot supply grey water (2), an outlet for the greywater (3), an inlet for cold supply water (4) and an outlet for preheated cold supply water (5). The heat exchanger is designed so that the cold supply water flows in the opposite direction through the heat exchanger relative to the warm greywater so that the heat exchanger works according to the counterflow principle and so that heat energy is transferred from the relatively hot greywater to the cold supply water. The system also has a strainer (9) located upstream the waste pipe that serves to prevent hair and other relatively large debris from entering and clogging the heat exchanger. Between the strainer and the heat exchanger a waste pipe (6) is mounted, leading the relatively warm shower greywater from the strainer (9) into the heat exchanger inlet for greywater (2). On the waste pipe a specially designed manifold (10) is installed having a hot water nozzle (11) which is directed downstream and into the waste pipe. This allows hot supply water at high velocity to be introduced into the waste pipe in order to create a pumping action that drives a cleaning flow through the heat exchanger to wash away fats and other deposits from the heat exchanger heat transfer surfaces, while at the same time no cleaning water flows from the waste pipe inlet (7) and up in for example the shower cubicle tray.

FIG. 1 b shows the manifold (10) and the nozzle outlet (11) as well as the waste pipe (6) aligned with the manifold (10). The manifold (10) is connected so that the distance from the manifold nozzle outlet for hot supply water (11) and the waste pipe outlet for greywater (8) is greater than two waste pipe diameters (12). Angle (13) between the manifold hot water outless nozzle and waste pipe are less than 55 degrees.

The invention claimed is:

1. A system for heat recovery from shower greywater containing:
   a. a heat exchanger (1) having an inlet for greywater (2), an outlet for greywater (3), an inlet for cold supply water (4) and an outlet for preheated supply water (5);
   b. a waste pipe (6) having an inlet for greywater (7) and an outlet for greywater (8); and
   c. a strainer (9) installed upstream the waste pipe inlet for greywater (7); where the waste pipe outlet for greywater (8) is connected to the heat exchanger's inlet for the greywater (2) and the heat exchanger (1) is designed so that the cold supply water flows in the opposite direction through the heat exchanger (1) relative to the relatively hot greywater, so that heat exchange under counterflow principle occurs so that heat energy from the hot greywater is transferred to the cold supply water; and characterized by a manifold (10) having a nozzled outlet for hot supply water (11) is connected to the waste pipe (6) so that the manifold nozzle outlet for hot supply water (11) opens into the waste pipe (6) at a position downstream the waste pipe inlet for greywater (7), but upstream the waste pipe outlet for greywater (8) In one embodiment, a mechanical check valve is located between the waste pipe inlet (7) and the manifold (10) for hot supply water (in the embodiment with check valve between waste pipe inlet (7) and manifold (10) no nozzeled outlet for hot supply water is needed) In one embodiment, the manifold nozzle outlet for hot supply water (11) is connected to the waste pipe (6) at a distance from the heat exchanger's inlet for the greywater (2) which is at least equal to twice the waste pipe diameter (12), where the manifold nozzle outlet for hot supply water (11) is directed downstream the waste pipe (5) at an angle (13) less than 55 degrees relative to the waste pipe (6) and where the manifold outlet nozzle for hot supply water have an effective flow area of 5-40 mm$^2$ In the embodiment with a nozzle outlet for hot supply water in the manifold (no check valve) no moving parts is used in the waste pipe (6).

2. A system according to claim 1, and where the manifold nozzle outlet for hot supply water (11) is connected to the waste pipe (6) at a distance from the heat exchanger's inlet for the greywater (2) which is at least equal to twice the waste pipe diameter (12), where the manifold nozzle outlet for hot supply water (11) is directed downstream of the waste pipe (5) at an angle (13) less than 55 degrees relative to the waste pipe (6) and where the manifold outlet nozzle for hot supply water have an effective flow area of 5-40 mm$^2$ In the embodiment with a nozzle outlet for hot supply water in the manifold (no check valve) no moving parts is used in the waste pipe (6).

3. A system according to claim 1, and wherein a cold water supply pipe (24) is coupled to a thermostatic mixing valve (25), where the mixing valve (25) also is connected between the heat exchanger exit for preheated supply water (5) and the shower mixer (17) cold water inlet.

4. A system according to claim 1, and wherein the manifold has an inlet for hot supply water (14) connected to a hot supply water source (15).

5. A system according to claim 4 and wherein the hot water supply (15) has a temperature of at least 50 degrees.

6. A system according to claim 4 and wherein the hot water supply (15) has a total pressure of at least 2 bar (g) during the heat exchanger cleaning.

7. A system according to claim 4, and wherein the system contains a shut-off valve for hot supply water (16) to control the flow of hot supply water from the hot water supply (15) to the waste pipe (6) where the shut-off valve (16) is positioned between the manifold nozzle outlet for hot supply water (11) and hot water supply (15).

8. A system according to claim 1 and wherein the heat exchanger has an efficiency of at least 60%, preferably at least 65%, preferably at least 70 percent.

9. A system according to claim 1 and wherein the heat exchanger's outlet for preheated cold supply water (5) is connected to a shower mixer with or without a thermostat (17).

10. A system according to claim 9 where the shower mixer (17) is connected to a hot supply water source (15) containing water with a temperature of 50 degrees.

11. A system according to claim 9, and further comprising a shower nozzle (18) connected to the shower mixer (17) via a water supply tube for tempered water (19).

12. A system according claim 1, and further comprising a stop valve for greywater and cleaning chemicals (20) located downstream the heat exchanger's outlet for greywater (3).

13. A shower cubicle (22) containing a system according to claim 1.

* * * * *